United States Patent
Svraka

(10) Patent No.: US 11,674,426 B2
(45) Date of Patent: Jun. 13, 2023

(54) EXHAUST AFTERTREATMENT SYSTEM

(71) Applicant: VOLVO TRUCK CORPORATION, Gothenburg (SE)

(72) Inventor: Irman Svraka, Tranås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/936,133

(22) Filed: Sep. 28, 2022

(65) Prior Publication Data

US 2023/0105660 A1  Apr. 6, 2023

(30) Foreign Application Priority Data

Oct. 5, 2021  (EP) ..................................... 21200836

(51) Int. Cl.
*F01N 3/28* (2006.01)
*F01N 3/30* (2006.01)
(Continued)

(52) U.S. Cl.
CPC ......... *F01N 3/2892* (2013.01); *B01D 53/944* (2013.01); *B01D 53/9418* (2013.01);
(Continued)

(58) Field of Classification Search
CPC ........ F01N 3/2892; F01N 3/021; F01N 3/106; F01N 3/2066; F01N 3/30; F01N 13/0097; F01N 2610/02; F01N 2610/1453; B01D 53/9418; B01D 53/9431; B01D 53/944; B01D 53/9477; B01D 53/9495; B01F 23/21; B01F 27/00; B01F 35/21111;
(Continued)

(56) References Cited

U.S. PATENT DOCUMENTS 6,293,097 B1 * 9/2001 Wu ..................... B01D 53/9431
60/307
9,840,953 B2 * 12/2017 Kulkarni ................... F01N 3/04
(Continued)

FOREIGN PATENT DOCUMENTS

DE   102007047774 A1   4/2009
WO   WO-2016024207 A1 *  2/2016  ............ B01F 5/0611

OTHER PUBLICATIONS

Extended European Search Report in corresponding European Application No. 21200836.1 dated Mar. 25, 2022 (5 pages).

*Primary Examiner* — Jesse S Bogue
(74) *Attorney, Agent, or Firm* — Venable LLP; Jeffri A Kaminski

(57) ABSTRACT

An exhaust aftertreatment system for an internal combustion engine includes an outer casing defining an exhaust flow path for exhaust gases from the internal combustion engine, a selective catalytic reduction unit provided in the exhaust flow path for reducing nitrogen oxides, a urea dosing device for adding urea to the exhaust flow upstream of the selective catalytic reduction unit, and a rotatable mixer device for mixing the urea with exhaust gases upstream of the selective catalytic reduction unit. The exhaust aftertreatment system further comprises an air inlet valve provided upstream of the mixer device for introducing air into the exhaust flow path, and an electric motor arranged for rotating the mixer device to create a suction of air into the exhaust flow path via the air inlet valve.

15 Claims, 2 Drawing Sheets

(51) Int. Cl.
| | |
|---|---|
| *F01N 3/021* | (2006.01) |
| *F01N 3/10* | (2006.01) |
| *F01N 13/00* | (2010.01) |
| *B01D 53/94* | (2006.01) |
| *B01F 23/21* | (2022.01) |
| *B01F 27/00* | (2022.01) |
| *B01F 35/221* | (2022.01) |
| *B01F 35/32* | (2022.01) |
| *B01F 35/21* | (2022.01) |
| *H02K 7/14* | (2006.01) |
| *F01N 3/20* | (2006.01) |

(52) U.S. Cl.
CPC ..... *B01D 53/9431* (2013.01); *B01D 53/9477* (2013.01); *B01D 53/9495* (2013.01); *B01F 23/21* (2022.01); *B01F 27/00* (2022.01); *B01F 35/2115* (2022.01); *B01F 35/21111* (2022.01); *B01F 35/221422* (2022.01); *B01F 35/3204* (2022.01); *F01N 3/021* (2013.01); *F01N 3/106* (2013.01); *F01N 3/2066* (2013.01); *F01N 3/30* (2013.01); *F01N 13/0097* (2014.06); *H02K 7/14* (2013.01); *F01N 2610/02* (2013.01); *F01N 2610/1453* (2013.01)

(58) Field of Classification Search
CPC .......... B01F 35/2115; B01F 35/221422; B01F 35/3204; H02K 7/14
See application file for complete search history.

(56) References Cited

U.S. PATENT DOCUMENTS

| | | | |
|---|---|---|---|
| 9,856,768 B2* | 1/2018 | Davis, Jr. | F01D 25/305 |
| 11,530,628 B2* | 12/2022 | Hirota | F01N 5/04 |
| 2012/0180457 A1* | 7/2012 | Liu | F01N 3/2066 |
| | | | 73/23.31 |
| 2016/0186640 A1* | 6/2016 | Calvo | B01F 25/4311 |
| | | | 60/324 |
| 2016/0376961 A1 | 12/2016 | Kulkarni et al. | |
| 2019/0232224 A1* | 8/2019 | Adelman | F01N 3/106 |
| 2020/0063625 A1 | 2/2020 | Adelman et al. | |
| 2021/0293171 A1* | 9/2021 | Aldred | F01N 3/2892 |

* cited by examiner

EXHAUST AFTERTREATMENT SYSTEM

TECHNICAL FIELD

The invention relates to an exhaust aftertreatment system for an internal combustion engine. It further relates to a method for controlling the exhaust aftertreatment system, an electronic control unit of an exhaust aftertreatment system, and a vehicle.

The invention can be applied in heavy-duty vehicles, such as trucks, buses and construction equipment. Although the invention will be described with respect to a truck, the invention is not restricted to this particular vehicle, but may also be used in other vehicles such as passenger cars and working machines. It may also be applied in vessels and in stationary construction equipment in which combustion engines and exhaust aftertreatment systems are used.

BACKGROUND

Exhaust aftertreatment systems, EATSs, are commonly used in the automotive field to reduce emissions from combustion engines, such as particulate emissions and nitrogen oxide, NOx, emissions. In order to comply with existing and upcoming emission legislations, it is particularly desirable to minimize cold start emissions. Furthermore, EATS robustness and durability are becoming increasingly important to ensure compliance with such emission legislations.

A major limiting factor of NOx conversion performance in an EATS is the availability of urea dosing and ammonia buffer in a Selective Catalytic Reduction, SCR, unit of the EATS. Typically, a urea dosing system hardware has a maximum dosing ability, commonly limited by exhaust temperature and mass flow. For example, a certain minimum temperature and exhaust mass flow are typically needed to allow urea dosing at all, whereas a higher temperature and an increased exhaust mass flow will in turn allow an increased flow of urea from the urea dosing system as long as the temperature is not too high.

Mixers may be used to efficiently mix urea and exhaust gases, and to help break down urea from the urea dosing system to ammonia, acting as a reducing agent in the conversion of NOx to nitrogen gas and water. The ammonia is stored in the SCR unit and used for NOx reduction. A mixer may for example be designed to create a swirl. It may also comprise a turbine that rotates due to the exhaust mass flow from the engine, causing the injected urea landing on or around the turbine to be mixed. The mixing process helps breaking down urea to ammonia.

To increase the NOx conversion performance of EATSs and reduce emissions from the combustion engine, it is generally desirable to store as much ammonia in the SCR as possible, as long as the temperature is not too high. However, at high operating temperatures, the risk of ammonia slip from the SCR unit increases. It is generally necessary to reduce the amount of urea added by the urea dosing system to avoid such ammonia slip.

SUMMARY

A primary object of the invention is to provide an EATS and a method for controlling the EATS that are in at least some aspect improved with respect to known EATSs and methods. In particular, it is an object to provide an EATS in which a relatively large amount of ammonia may be stored in the SCR, with a reduced risk of ammonia slip. Another object is to provide an EATS with improved emission control.

According to a first aspect of the invention, the exhaust aftertreatment system comprises:
- an outer casing having an exhaust gas inlet and an exhaust gas outlet between which an exhaust flow path for exhaust gases from the internal combustion engine is provided,
- a selective catalytic reduction (SCR) unit provided in the exhaust flow path for reducing nitrogen oxides,
- a urea dosing device for adding urea to the exhaust flow upstream of the selective catalytic reduction unit, and
- a rotatable mixer device for mixing the urea with exhaust gases upstream of the selective catalytic reduction unit.

The exhaust aftertreatment system further comprises an air inlet valve provided upstream of the mixer device for introducing air into the exhaust flow path, and an electric motor arranged for rotating the mixer device to create a suction of air into the exhaust flow path via the air inlet valve.

By the provision of an EATS which comprises an air inlet valve in the exhaust flow path and an electric motor arranged for rotating the mixer device, the mass flow through a portion of the EATS where urea is decomposed can be significantly increased thanks to the created suction of air. This enhances the decomposition of the urea into ammonia and carbon dioxide. Thereby, the urea dosage can be increased, in turn increasing the amount of ammonia, i.e. reducing agent, that can be stored in the SCR unit. The NOx conversion performance of the EATS may thereby be improved.

An additional benefit arising from the provision of the air inlet valve and the electric motor is that they allow for a more versatile temperature control of the SCR unit. For example, by opening the air inlet valve and running the electric motor, the SCR unit may be cooled down to reduce the risk of ammonia slip, independently of the temperature of the engine. The ammonia buffering capability of the SCR unit typically decreases as the temperature increases above a certain temperature threshold. Therefore, by cooling the SCR unit to a temperature of less than e.g. 300° C., a larger amount of ammonia can be stored in the SCR unit without risking ammonia slip. Thus, a larger amount of urea may be added by the urea dosing device.

As used herein, the terms "upstream" and "downstream" refer to the exhaust flow path through the EATS.

The mixer device may be designed as a fan, with one or more blades, preferably at least two blades, fixed to a rotatable hub driven by the electric motor. The mixer device may be provided in a mixing chamber, or mixing pipe, of the EATS.

The air introduced via the air inlet valve is preferably ambient air. In other words, the air inlet valve is arranged to, when open, allow a flow of ambient air from outside of the exhaust aftertreatment system into the exhaust flow path.

The SCR unit referred to may be a main SCR unit of the EATS, such as a single SCR unit of the EATS. It is also possible that the SCR unit is a so-called pre-SCR unit, i.e., an additional SCR unit, which is usually smaller than the main SCR unit. Thus, the invention is applicable with one or more SCR units within the EATS. An ammonia slip catalyst (ASC) unit may be provided in connection with the SCR unit. In a common configuration of the EATS, two parallel assemblies are provided downstream of the mixer device, each assembly comprising an SCR unit followed by an ASC unit.

The exhaust aftertreatment system may further comprise an electronic control unit configured to control the air inlet valve and the electric motor. The electronic control unit may be configured to control the air inlet valve and the electric motor so that a mass flow through the mixer device is increased. Thereby, the amount of urea added by the urea dosing device can be increased, which increases the efficiency of the NOx reduction in the SCR unit. The electronic control unit enables an improved control of the amount of air and the temperature within the EATS. The air inlet valve is controlled by controlling a position of the air inlet valve, also referred to as a state, such as an opening degree of the air inlet valve.

The electronic control unit may be configured to control the rotational speed of the electric motor without changing the position of the air inlet valve. For example, if an improved mixing without added air flow is desired, the rotational speed of the electric motor may be increased without opening the air inlet valve.

Optionally, the electronic control unit is configured to control a position of the air inlet valve and a rotational speed of the electric motor based on at least one of a temperature measured by a temperature sensor in the exhaust aftertreatment system, a determined mass flow of exhaust gases from the internal combustion engine, and an amount of urea added by the urea dosing device. By controlling the position of the air inlet valve and the rotational speed based on the defined variables, it is possible to improve the conditions for catalytic NOx reduction within the SCR unit.

The temperature sensor may for example be a temperature sensor already provided at some position within the EATS, measuring the temperature of the exhaust gases or of one of the components of the EATS. The mass flow of exhaust gases from the internal combustion engine may typically be determined in e.g. an engine control unit based on engine operating conditions, although it is also possible to use a mass flow sensor to determine the mass flow.

The electronic control unit may herein be configured to receive data from one or more temperature sensors of the EATS, from an engine control unit, from a mass flow sensor of the EATS, and/or from the urea dosing device.

Typically, the electronic control unit may be configured to control the position of the air inlet valve and the rotational speed of the electric motor based on at least the temperature measured by a temperature sensor in the exhaust aftertreatment system and the mass flow of exhaust gases from the internal combustion engine, wherein the amount of urea added by the urea dosing device may optionally be used as an additional control parameter.

Optionally, the electronic control unit is configured to increase an opening degree of the air inlet valve and/or the rotational speed of the electric motor in response to at least one of a detected increase in a temperature measured by a temperature sensor in the exhaust aftertreatment system, a detected reduction in an amount of urea added by the urea dosing device, and a detected reduction in a determined mass flow of exhaust gases from the internal combustion engine. In all these cases, an increased total mass flow can be achieved, used for increasing the amount of urea added by the urea dosing device and/or for cooling the SCR unit to reduce the risk for ammonia slip.

Optionally, the electronic control unit may be configured to control the air inlet valve to an open position only when the electric motor is running. This ensures that exhaust gases cannot escape from the outer casing of the EATS via the air inlet valve, thanks to the pressure difference caused by the motor driven mixer device.

Optionally, the air inlet valve is gradually controllable between a closed position and a fully open position. This enables a precise mass flow control. In other configurations, the air inlet valve may be configured as a two-position valve settable to one open and one closed position.

Optionally, the air inlet valve is configured as a one-way valve. The valve may thus be configured to allow air to flow into the EATS, while no gas flow out from the EATS via the valve is possible.

Optionally, the exhaust aftertreatment system further comprises a particulate filter provided upstream of the urea dosing device, wherein the air inlet valve is positioned upstream of the particulate filter. The particulate filter may be a particulate filter adapted to remove particulate matter and/or soot from the combusted fuel used by the engine. For a diesel-powered combustion engine, the particulate filter is a diesel particulate filter (DPF). By positioning the air inlet valve upstream of the particulate filter, it is possible to increase the amount of oxygen entering the particulate filter. This results in an improved passive soot regeneration of the particulate filter, given that the temperature circumstances are correct.

Optionally, the exhaust aftertreatment system further comprises an oxidation catalyst unit provided upstream of the urea dosing device, wherein the air inlet valve is positioned upstream of the oxidation catalyst unit. The oxidation catalyst unit may, in the case of diesel fuel, be a diesel oxidation catalyst (DOC) unit. With the air inlet valve positioned upstream of the oxidation catalyst unit, a better temperature control of the oxidation catalyst unit is achieved. The temperature of the oxidation catalyst unit largely determines the ratio of $NO/NO_2$ coming out of the oxidation catalyst unit, which ratio is important to achieve an efficient NOx reduction in the SCR unit provided downstream of the oxidation catalyst unit. High temperatures can lead to too much $NO_2$ (>50%), which reduces the NOx conversion rate in the SCR. These high temperatures can be avoided by decreasing the temperature using an added ambient air flow. Thus, the positioning of the air inlet valve upstream of the oxidation catalyst unit allows controlling the $NO/NO_2$ ratio without changing the engine functionality and affecting the fuel consumption.

Optionally, the oxidation catalyst unit is provided upstream of the particulate filter, wherein the air inlet valve is positioned upstream of the oxidation catalyst unit. In this case, additional air may be provided to the oxidation catalyst unit during an active particulate filter regeneration process, thus allowing an increased hydrocarbon (HC) dosing and a more effective regeneration.

Optionally, the EATS may comprise an additional SCR unit, a so-called pre-SCR unit, positioned upstream of the oxidation catalyst unit. The air inlet valve may herein be provided upstream of the pre-SCR unit.

Optionally, the exhaust aftertreatment system further comprises a particulate filter and/or an oxidation catalyst unit, such as a DOC unit, provided upstream of the urea dosing device, wherein the air inlet valve is positioned downstream of the particulate filter and/or of the oxidation catalyst unit. This allows selective temperature control of the components downstream of the air inlet valve.

The air inlet valve may be provided in the outer casing, i.e., the air inlet valve defines a selectively openable opening in the outer casing of the EATS. The outer casing is herein a casing, or an assembly of casing units that are sealingly fixed to each other, that delimits the exhaust flow path from ambient air. Substrates of the EATS, i.e. a substrate of the SCR unit and of any other components, such as of a particulate filter and/or an oxidation catalyst unit, may be enclosed within an outer casing formed as one piece, or have their own separate casings that are sealingly fixed together to form the outer casing.

According to a second aspect of the invention, a vehicle comprising an internal combustion engine and the exhaust aftertreatment system according to the first aspect is provided. The combustion engine is adapted for the combustion of fuel, such as diesel, petrol, hydrogen, gaseous fuels, etc.

According to a third aspect of the invention, a method for controlling the exhaust aftertreatment system according to the first aspect is provided. The method comprises the steps of:
  determining a temperature within the exhaust aftertreatment system, and/or an amount of urea added by the urea dosing device, and/or a mass flow of exhaust gases from the internal combustion engine,
  controlling a rotational speed of the electric motor and a position of the air inlet valve based on the determined temperature and/or the determined amount of urea and/or the determined mass flow of exhaust gases.

The method according to the third aspect offers an improved control of mass flow through and temperature within the EATS. By controlling the rotational speed of the electric motor and the position of the air inlet valve, the mass flow and temperature can be controlled without affecting the engine operating conditions.

Optionally, the step of controlling the rotational speed of the electric motor and the position of the air inlet valve is performed so that the rotational speed of the electric motor is increased and/or an opening degree of the air inlet valve is increased when:
  the determined amount of urea fulfils a predetermined first condition, and/or
  the determined mass flow of exhaust gases fulfils a predetermined second condition, and/or
  the determined temperature fulfils a predetermined third condition.

Thereby, a total mass flow of gases through the mixer device may be increased when any one of the predetermined conditions is fulfilled. This will also result in a lowering of the temperature within the EATS. The first condition may be set to be fulfilled when the determined amount of urea is below a threshold level, in which case an increased mass flow makes it possible to increase the amount of urea that can be added, given that a defined minimum temperature is exceeded. The second condition may be set to be fulfilled when the mass flow of exhaust gases from the combustion engine is lower than a threshold level, since this limits the amount of urea that may be dosed. The third condition may be set to be fulfilled when a threshold temperature is exceeded, e.g., since a too high temperature may increase the risk of ammonia slip. The first, second and third conditions may be combined, and it is furthermore possible to define several different predetermined first, second and third conditions.

Preferably, the rotational speed increase of the electric motor and the opening of the air inlet valve are coordinated, e.g. so that the opening degree of the air inlet valve is only increased when the rotational speed is increased.

According to a fourth aspect of the invention, an electronic control unit for controlling an exhaust aftertreatment system is provided, wherein the electronic control unit is configured to perform the steps of the method according to the third aspect.

The electronic control unit may form part of a control system of the EATS, such as a computerized control system.

Such a control system may include one or more control unit(s), such as one or more electronic control units. The control system may comprise at least one communication interface for receiving data communicated from other units within the vehicle, such as from various sensors, systems and control units, in particular from an engine control unit and from sensor(s) within the EATS. The control system may be configured to communicate wirelessly or via a hardwire system. The electronic control unit may also be provided separately from the EATS, such as in another control system or forming part of another electronic control unit of the vehicle. The electronic control unit is in this case configured to communicate with the various sensors and devices of the EATS, such as with the urea dosing device, the temperature sensor(s), the air inlet valve, and the electric motor, either directly or via an EATS control unit.

A computer program comprising program code means for performing the method steps according to the first aspect when the program is run on a computing unit of the control unit according to the fourth aspect may also be provided. Furthermore, a computer readable medium carrying a computer program comprising program code means for performing the steps of the method according to the first aspect when said program is run on a computing unit of the control unit may be provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
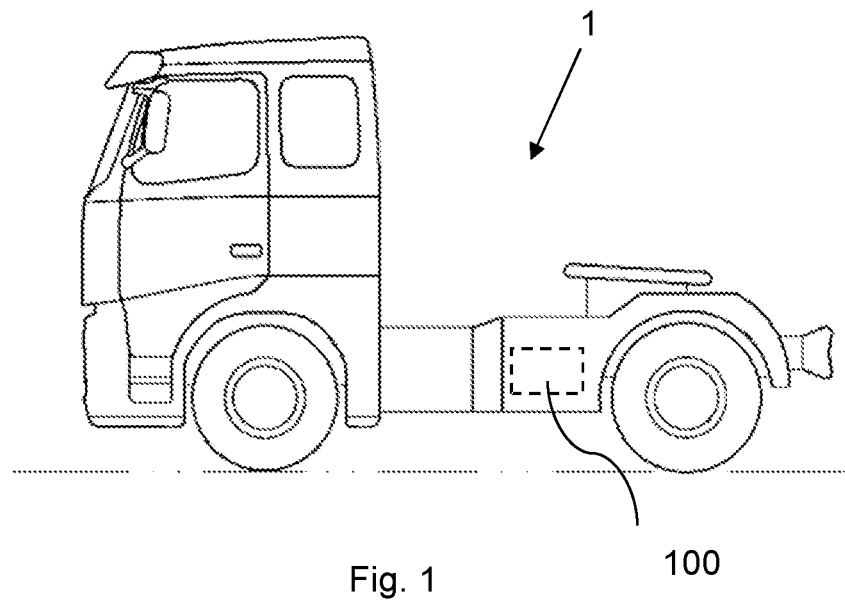
FIG. 1 is a schematic side view of a vehicle.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a truck is schematically shown in FIG. 1. The vehicle 1 includes an internal combustion engine (not shown) for propulsion of the vehicle 1, and an exhaust system including an exhaust aftertreatment system (EATS) 100 for guiding and handling exhaust gases generated by the internal combustion engine.

Figure 2:
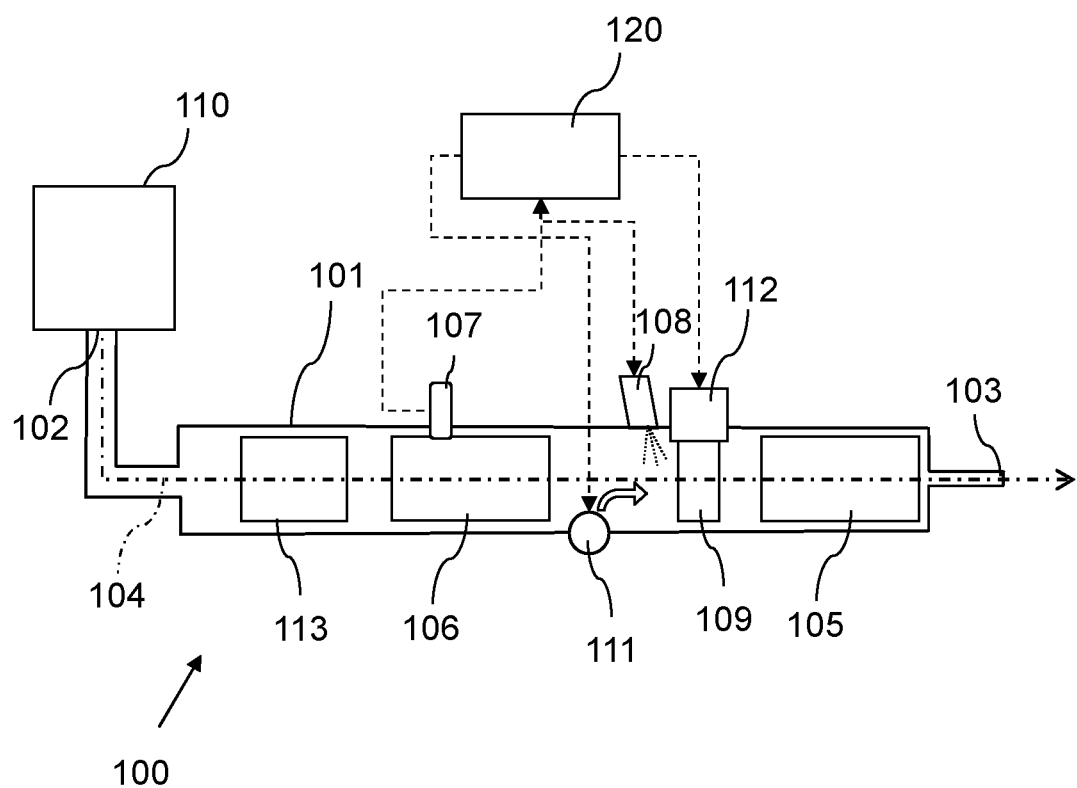
FIG. 2 is a schematic view of an exhaust aftertreatment system according to a first embodiment of the present disclosure.

An exhaust aftertreatment system 100 according to a first embodiment, which may be applied in the vehicle 1, is schematically illustrated in FIG. 2, showing the EATS 100 during operation of the vehicle 1. An outer casing 101 delimits an exhaust flow path 104 of the exhaust system 100, extending from an internal combustion engine 110, via an exhaust gas inlet 102 into the exhaust EATS 100, and out of the EATS 100 via an exhaust gas outlet 103. The EATS 100 in the shown embodiment comprises three components 105, 106, 113 for treatment of exhaust gases along the exhaust flow path 104. In the shown embodiment, the components 105, 106, 113 are a Selective Catalytic Reduction (SCR) unit 105, a particulate filter 106, such as a Diesel Particulate Filter (DPF) unit 106, and an oxidation catalyst unit 113, such as a Diesel Oxidation catalyst (DOC) unit 113, respectively. The SCR unit 105 is located furthest downstream, the particulate filter 106 is located upstream of the SCR unit 105, and the oxidation catalyst unit 113 is located upstream of the particulate filter 106.

The EATS 100 further comprises a urea dosing device 108 for adding urea to the exhaust flow upstream of the SCR unit 105, and a rotatable mixer device 109 for mixing the urea added by the urea dosing device 108 with exhaust gases upstream of the SCR unit 105. Both the urea dosing device 108 and the rotatable mixer device 109 are located between the particulate filter 106 and the SCR unit 105, so that the urea is added and mixed with the exhaust gases immediately upstream of the SCR unit 105.

The amount of urea added by the urea dosing device 108 is typically regulated to achieve a desired buffer of ammonia ($NH_3$) in the SCR unit 105. A buffer target level for $NH_3$ is set and the amount of urea to be added to achieve the buffer target level is set in dependence on exhaust mass flow from the engine 110 and the SCR unit temperature, in turn dependent on engine operating temperature. Models may be used to determine the amount of urea to be dosed to achieve the buffer target level for the current operating conditions in terms of SCR unit temperature and exhaust mass flow.

An openable and closable air inlet valve 111 is further provided upstream of the mixer device 109 for introducing air into the exhaust flow path 104 as illustrated by an arrow in FIG. 2. An electric motor 112 is also provided, which electric motor 112 is arranged for rotating the mixer device 109 to create a suction of air into the exhaust flow path 104 via the air inlet valve 111. The rotatable mixer device 109 may be designed as a fan, wherein the electric motor 112 is arranged to rotate a rotatable hub of the mixer device 109 to create a suction force.

The EATS 100 further comprises an electronic control unit 120 configured to control the air inlet valve 111 and the electric motor 112.

Furthermore, one or more temperature sensors, herein illustrated as a single temperature sensor 107, is/are provided. The temperature sensor 107 is in the illustrated embodiment arranged to measure the temperature of the particulate filter 106, but may alternatively be arranged to measure the temperature of the exhaust gases, or of another component of the EATS 100, such as of the SCR unit 105.

The electronic control unit 120 may be configured to control a position of the air inlet valve 111, i.e. an opening degree thereof, and a rotational speed of the electric motor 112. For this purpose, it may use as inputs a temperature measured by the temperature sensor 107 (or by another temperature sensor), a mass flow of exhaust gases from the internal combustion engine 110, e.g. as measured by a mass flow sensor (not shown) or as determined using engine operating conditions as input and received from an engine control unit, and an amount of urea added by the urea dosing device 108. The urea dosing device 108 is thus configured to communicate with the electronic control unit 120, and the electronic control unit 120 is further configured to communicate with e.g. an engine control unit (not shown). The temperature sensor 107 is also arranged to communicate with the electronic control unit 120 and provide temperature measurement data thereto.

An engine operating condition is herein to be understood as an operating condition of the engine 110 that affects the exhaust from the engine 110, e.g., exhaust gas temperature, exhaust gas flow, and exhaust gas composition. The engine operating condition may, e.g., be defined by one or more of an engine speed, an engine load, one or more fuel injection parameters, a fuel type, a fuel mixture, a fuel-to-air mixture, ambient conditions etc.

During operation of the engine 110, the air inlet valve 111 and the electric motor 112 may be controlled by means of the electronic control unit 120 to increase the mass flow through the mixer device 109 and/or to lower the temperature within the SCR unit 105. The electronic control unit 120 may be configured so that it controls the air inlet valve 111 to an open position only when the electric motor 112 has been started, so that escape of exhaust gases through the air inlet valve 111 is prevented.

In one example, the engine 110 is operated at a relatively low temperature to reduce fuel consumption, giving low temperature exhaust gases. The low temperature may result in urea deposit formation in the SCR unit 105, and the amount of urea added by the urea dosing device 108 is therefore normally limited. By starting the electric motor 112 and opening the air inlet valve 111, the mixer device 109 starts to rotate and creates a mass flow of air, which is added to the exhaust mass flow and increases the total mass flow through the mixer device 109 and the SCR unit 105. The increased mass flow allows for an increased urea dosage, given that the temperature is not lower than a defined minimum temperature threshold. Above the minimum temperature threshold, the conditions for urea deposit formation within the SCR unit 105 are deteriorated when the mass flow is increased.

In another example, the engine is operated at a high temperature resulting in temperatures above 300° C. within the EATS 100 but generating a relatively small mass flow of exhaust. The electric motor 112 may be started and the air inlet valve 111 opened to increase the mass flow and at the same time reduce the temperature. This may allow for a larger dosage of urea, since on one hand the mass flow is increased, and since on the other hand the temperature can be reduced below 300° C., thereby reducing the risk of ammonia slip from the SCR unit 105.

Figure 3:
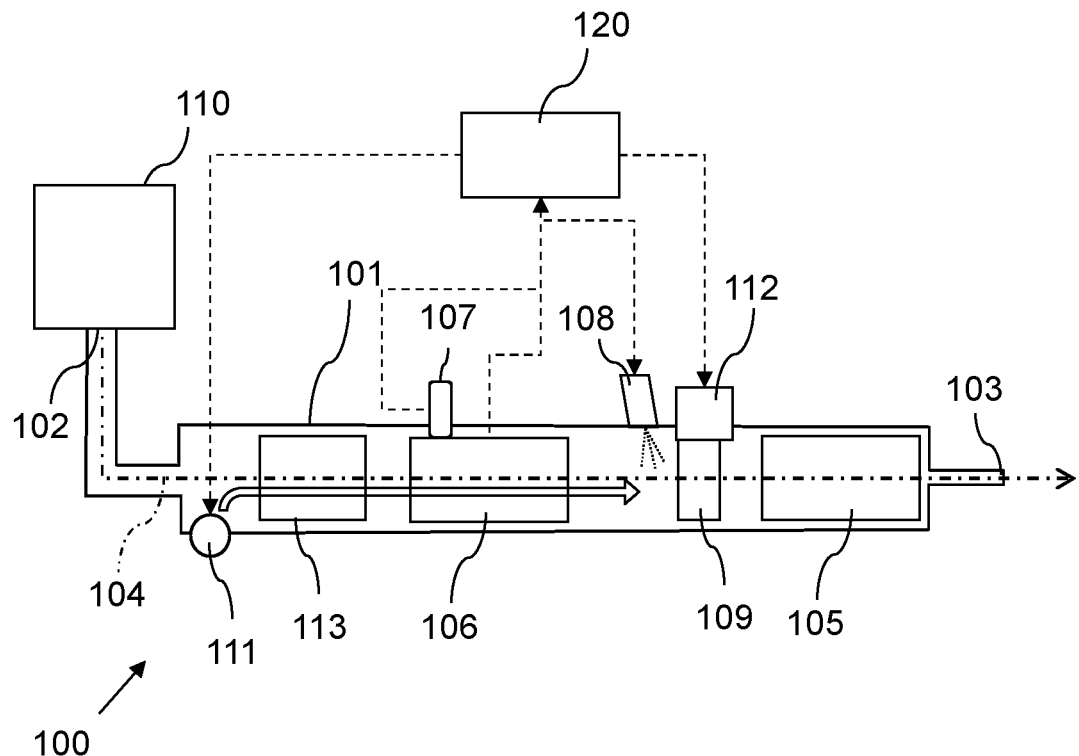
FIG. 3 is a schematic view of an alternative exhaust aftertreatment system according to a second embodiment.

An exhaust aftertreatment system 100 according to a second embodiment is schematically illustrated in FIG. 3. The EATS 100 according to this embodiment differs from the first embodiment in that the air inlet valve 111 is provided upstream of the oxidation catalyst unit 113. Thus, a mass flow of air created by starting the electric motor 112 and opening the air inlet valve 111 passes the oxidation catalyst unit 113, the particulate filter 106, as well as the mixer device 109 and the SCR unit 105. This means that the temperature of not only the SCR unit 105, but also of the oxidation catalyst unit 113 and the particulate filter 106, may be reduced independently of the engine operating conditions.

The induced mass flow of air may in the second embodiment be exploited for improved passive soot regeneration of the particulate filter 106. Moreover, the temperature of the oxidation catalyst unit 113 may be lowered in order to improve the $NO/NO_2$ ratio coming out of the oxidation catalyst unit 113. Additionally, an increased mass flow of air may be provided to the oxidation catalyst unit 113 during an active particulate filter regeneration process, thus allowing an increased hydrocarbon (HC) dosing to the oxidation catalyst unit 113, and thereby a more effective regeneration of the particulate filter 106.

In an alternative embodiment, not illustrated, the air inlet valve 111 may be arranged between the oxidation catalyst unit 113 and the particulate filter 106 in the exhaust flow path 104.

Figure 4:
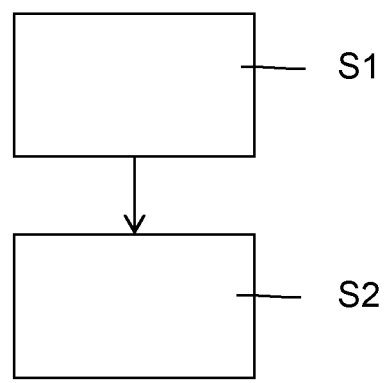
FIG. 4 is a flow chart illustrating a method according to the present disclosure.

A method for controlling the EATS 100 according to an embodiment of the present disclosure is illustrated in FIG. 4. The method comprises the steps S1 and S2 as described in the following and may be performed by the control unit 120.

S1: Determining a temperature within the EATS 100, and/or an amount of urea added by the urea dosing device 108, and/or a mass flow of exhaust gases from the internal combustion engine 110. This step may be performed using sensors, such as the temperature sensor 107, and information provided from an engine control unit and from the urea dosing device 108.

S2: Controlling a rotational speed of the electric motor 112 and a position of the air inlet valve 111, i.e. an opening degree, based on the determined temperature and/or the determined amount of urea and/or the determined mass flow of exhaust gases. This step may be performed so that the rotational speed of the electric motor 112 is increased and/or an opening degree of the air inlet valve 111 is increased when:
the determined amount of urea fulfils a predetermined first condition, such as being below a predetermined urea dosage threshold level, and/or
the determined mass flow of exhaust gases fulfils a predetermined second condition, such as the mass flow of exhaust gases being below a predetermined mass flow threshold level, and/or
the determined temperature fulfils a predetermined third condition, such as being above a predetermined temperature threshold value.

The first, second and third conditions may be defined depending on a mode of operation of the EATS 100 and/or the engine 110, and on a purpose of the temperature and/or mass flow control. For example, for an active particulate filter regeneration process, different predetermined conditions may be defined than for urea dosage control during normal operation of the EATS 100. Still other predetermined conditions may be defined for NO/NO₂ ratio control.

The EATS 100 may comprise several temperature sensors for measuring temperature at different locations within the EATS 100. Different temperature thresholds may be defined depending on which temperature sensor is used to measure the temperature.

The electric motor 112 may be powered by a battery, such as a rechargeable battery.

The air inlet valve 111 may preferably be a gradually controllable valve, i.e. a valve with an adjustable variable orifice. By way of example only, the gradually controllable valve may be a flap valve, a check valve, or a plug valve, but any suitable valve may be used.

The EATS may comprise more than one SCR unit, wherein a urea dosing device may be provided for each one of the SCR units. Optionally, a rotatable mixer device driven by an electric motor may be provided upstream each one of the SCR units, respectively. For example, in an EATS comprising two SCR units, such as a main SCR unit as described above and a pre-SCR unit positioned upstream of an oxidation catalyst unit, two rotatable mixer devices and two separate electric motors may be provided, optionally also two air inlet valves positioned upstream and downstream of the pre-SCR unit, respectively. Furthermore, in some embodiments, the air inlet valve, the rotatable mixer device and the electric motor may only be provided at the pre-SCR unit.

The electronic control unit 120 may include a microprocessor, a microcontroller, a programmable digital signal processor or another programmable device. Thus, the electronic control unit 120 comprises electronic circuits and connections (not shown) as well as processing circuitry (not shown) such that the electronic control unit 120 can communicate with different parts of the vehicle 1 or with different control units of the vehicle 1, such as with various sensors, systems and control units, in particular with one or more engine control units (not shown) of the vehicle 100. The electronic control unit 120 may comprise modules in either hardware or software, or partially in hardware or software, and communicate using known transmission buses such a CAN-bus and/or wireless communication capabilities. The processing circuitry may be a general-purpose processor or a specific processor. The electronic control unit 120 may comprise a non-transitory memory for storing computer program code and data. Thus, the skilled person realizes that the electronic control unit 120 may be embodied by many different constructions. Although herein illustrated as a single unit, the electronic control unit 120 may be formed of several different control units configured to communicate with each other, such as separate control units for controlling the urea dosing device 108 and for controlling the electric motor 112 and the air inlet valve 111.

It is to be understood that the present invention is not limited to the embodiments described above and illustrated in the drawings; rather, the skilled person will recognize that many changes and modifications may be made within the scope of the appended claims.

The invention claimed is:

1. An exhaust aftertreatment system for an internal combustion engine, the exhaust aftertreatment system comprising:
an outer casing having an exhaust gas inlet and an exhaust gas outlet between which an exhaust flow path for exhaust gases from the internal combustion engine is provided,
a selective catalytic reduction unit provided in the exhaust flow path for reducing nitrogen oxides,
a urea dosing device for adding urea to the exhaust flow upstream of the selective catalytic reduction unit, and
a rotatable mixer device for mixing the urea with exhaust gases upstream of the selective catalytic reduction unit, wherein
the exhaust aftertreatment system further comprises an air inlet valve provided upstream of the mixer device for introducing air into the exhaust flow path, and an electric motor arranged for rotating the mixer device to create a suction of air into the exhaust flow path via the air inlet valve.

2. The exhaust aftertreatment system according to claim 1, further comprising an electronic control unit configured to control the air inlet valve and the electric motor.

3. The exhaust aftertreatment system according to claim 2, wherein the electronic control unit is configured to control a position of the air inlet valve and a rotational speed of the electric motor based on at least one of a temperature measured by a temperature sensor in the exhaust aftertreatment system, a determined mass flow of exhaust gases from the internal combustion engine, and an amount of urea added by the urea dosing device.

4. The exhaust aftertreatment system according to claim 2, wherein the electronic control unit is configured to increase an opening degree of the air inlet valve and/or the rotational speed of the electric motor in response to at least one of a detected increase in a temperature measured by a temperature sensor in the exhaust aftertreatment system, a detected reduction in an amount of urea added by the urea dosing device, and a detected reduction in a determined mass flow of exhaust gases from the internal combustion engine.

5. The exhaust aftertreatment system according to claim 2, wherein the electronic control unit is configured to control the air inlet valve to an open position only when the electric motor is running.

6. The exhaust aftertreatment system according to claim 1, wherein the air inlet valve is gradually controllable between a closed position and a fully open position.

7. The exhaust aftertreatment system according to claim 1, wherein the air inlet valve is configured as a one-way valve.

8. The exhaust aftertreatment system according to claim 1, further comprising a particulate filter provided upstream of the urea dosing device, wherein the air inlet valve is positioned upstream of the particulate filter.

9. The exhaust aftertreatment system according to claim 8, further comprising an oxidation catalyst unit provided upstream of the particulate filter, wherein the air inlet valve is positioned upstream of the oxidation catalyst unit.

10. The exhaust aftertreatment system according to claim 1, further comprising a particulate filter and/or an oxidation catalyst unit provided upstream of the urea dosing device, wherein the air inlet valve is positioned downstream of the particulate filter and/or of the oxidation catalyst unit.

11. The exhaust aftertreatment system according to claim 1, wherein the air inlet valve is provided in the outer casing.

12. A vehicle comprising an internal combustion engine and the exhaust aftertreatment system according to claim 1.

13. A method for controlling the exhaust aftertreatment system according to claim 1, comprising the steps of:
   determining a temperature within the exhaust aftertreatment system, and/or an amount of urea added by the urea dosing device, and/or a mass flow of exhaust gases from the internal combustion engine,
   controlling a rotational speed of the electric motor and a position of the air inlet valve based on the determined temperature and/or the determined amount of urea and/or the determined mass flow of exhaust gases.

14. The method according to claim 13, wherein the step of controlling the rotational speed of the electric motor and the position of the air inlet valve is performed so that the rotational speed of the electric motor is increased and/or an opening degree of the air inlet valve is increased when:
   the determined amount of urea fulfils a predetermined first condition, and/or
   the determined mass flow of exhaust gases fulfils a predetermined second condition, and/or
   the determined temperature fulfils a predetermined third condition.

15. An electronic control unit for controlling an exhaust aftertreatment system, wherein the electronic control unit is configured to perform the steps of the method according to claim 13.

* * * * *